United States Patent
Andersson et al.

(10) Patent No.: US 8,411,400 B2
(45) Date of Patent: Apr. 2, 2013

(54) METHOD AND APPARATUS FOR MITIGATION OF DYNAMIC OVERVOLTAGE

(75) Inventors: Ulf Andersson, Raleigh, NC (US); Hans Bjorklund, Ludvika (SE); John Daniel, Apex, NC (US); David Dickmander, Raleigh, NC (US)

(73) Assignee: ABB Technology AG, Zurich (CH)

( * ) Notice: Subject to any disclaimer, the term of this patent is extended or adjusted under 35 U.S.C. 154(b) by 335 days.

(21) Appl. No.: 12/528,248

(22) PCT Filed: Feb. 26, 2008

(86) PCT No.: PCT/US2008/002537
§ 371 (c)(1), (2), (4) Date: Aug. 21, 2009

(87) PCT Pub. No.: WO2008/106136
PCT Pub. Date: Sep. 4, 2008

(65) Prior Publication Data
US 2010/0053830 A1    Mar. 4, 2010

Related U.S. Application Data

(60) Provisional application No. 60/903,751, filed on Feb. 27, 2007.

(51) Int. Cl.
*H02H 3/00* (2006.01)
(52) U.S. Cl. .......................... 361/62; 361/65
(58) Field of Classification Search ............... 361/56, 361/91.1, 35, 111, 62–69
See application file for complete search history.

(56) References Cited

U.S. PATENT DOCUMENTS

| | | | |
|---|---|---|---|
| 4,689,733 A | | 8/1987 | Guth et al. |
| 5,287,288 A | * | 2/1994 | Brennen et al. .................. 702/58 |
| 5,604,423 A | * | 2/1997 | Degeneff et al. ............. 323/258 |
| 6,459,559 B1 | * | 10/2002 | Christofersen ............... 361/124 |
| 6,738,247 B2 | * | 5/2004 | Uchida ......................... 361/93.1 |

FOREIGN PATENT DOCUMENTS

| | | |
|---|---|---|
| CN | 1311466 A | 9/2001 |
| CN | 1166993 C | 9/2004 |
| EP | 0166954 A1 | 7/1984 |

OTHER PUBLICATIONS

State Intellectual Property Office of the People's Republic of China, Application No. 200880006452.3, Entitled "Method and Apparatus For Mitigation of Dynamic Overvoltage", Notification of 2nd Office Action—English Translation, Date of Notification Jul. 30, 2012.

(Continued)

*Primary Examiner* — Danny Nguyen
(74) *Attorney, Agent, or Firm* — Michael M. Rickin

(57) ABSTRACT

A distribution and power transformer has its primary connected to the high voltage bus of the network and its secondary connected to a switching device. Upon the occurrence of a condition known to cause a dynamic overvoltage (DOV) and the occurrence of the DOV, a control system causes the switching device to change from a nonconductive mode to a conductive mode in less than the time for one cycle of the operating frequency of the AC network. This change in switching device conduction places a short circuit across the transformer secondary and thus mitigates the DOV.

14 Claims, 4 Drawing Sheets

OTHER PUBLICATIONS

Mohamed E A et al: "Prediction of DC Load-Rejection Dynamic Overvoltages Using Pattern Recognition", IEE Proceedings C, Generation, Transmission, Distribution, Institution of Electrical Engineers, Stevenage, GB, vol. 135, No. 6, Part C, Nov. 1, 1988, pp. 480-486, XP000669483, ISSN: 0143-7046, the whole document.

Horwill C et al.: "Static VAR Compensator Design and Application for UK Transmission System Regulation", Advances in Power System Control, Operation and Management, 1991. APSC 0M-91., 1991 International Conference on Hong Kong, Hong Kong, IEEE, Jan. 1, 1991, pp. 129-134, XP006512531, ISBN: 978-0-86341-246-2, the whole document.

IEEE: "IEEE Guide for the Functional Specification of Medium Voltage (1 kV-35 kV) Electronic Shunt Devices for Dynamic Voltage Compensation" (online), May 11, 2005, IEEE Power Engineering Society, New York, USA 1623, XP002483929, Retrieved from the Internet: URL:http://ieeexplore.ieee.org/iel5/9830/30988/01438744.pdf?isnumber=30988&prod=,STD&arnumber=1438744&arnumber=1438744> (retrieved on Jun. 12, 2008) the whole document.

Authorized Officer Clifford Lekahena, International Searching Authority, PCT Notification of Transmittal of the International Search Report and The Written Opinion of The International Searching Authority, or The Declaration having a mailing date of Jul. 15, 2008 in International Application No. PCT/US2008/002537 (inventors Andersson et al.).

\* cited by examiner

US 8,411,400 B2

METHOD AND APPARATUS FOR MITIGATION OF DYNAMIC OVERVOLTAGE

CROSS REFERENCE TO RELATED APPLICATION

This application claims the priority of U.S. provisional patent application Ser. No. 60/903,751 filed on Feb. 27, 2007, entitled "Method And Apparatus For Mitigation Of Dynamic Overvoltage" the contents of which are relied upon and incorporated herein by reference in their entirety, and the benefit of priority under 35 U.S.C. 119(e) is hereby claimed.

FIELD OF THE INVENTION

This invention relates to the occurrence of temporary overvoltages on AC networks and more particularly to the mitigation of those voltages.

DESCRIPTION OF THE PRIOR ART

Undesirable temporary overvoltages can occur for a variety of reasons on AC networks and have the potential to adversely affect connected equipment, possibly resulting in equipment damage. For example, the temporary overvoltages can occur in conjunction with conventional (line commutated) high voltage DC (HVDC) terminals in cases where the DC system is blocked (conduction halted) when a large amount of capacitive shunt compensation and harmonic filters are connected because of the operation of some kind of protection in the DC system. The HVDC control system is normally designed to trip the shunt compensation at the instant of converter blocking, thereby limiting the duration of the overvoltage to a few cycles, corresponding to the breaker opening times.

The magnitude of the dynamic overvoltage is directly related to the short circuit capacity of the AC system and the size of the shunt compensation. Dynamic overvoltage (DOV) can be an issue in those systems that have a low short circuit capacity compared to the rating of the HVDC transmission. Systems having this characteristic are known as weak systems.

Dynamic overvoltage can be particularly problematic in systems with generation connected at or near the bus experiencing the DOV event. In such a configuration, avoidance of generator self-excitation and/or generator overflux can be a decisive design consideration.

Static Var Compensators (SVC) where that term includes SVCs, Voltage Source Converter SVC (VSC-SVC) sold by various manufacturers such as ABB and others using trademarks or tradenames such as SVC Light or STATCOM, thyristor switched or thyristor controlled reactors (TSR, TCR), and synchronous condensers are used to provide reactive power compensation to a power system. Part of the function of these systems may include suppression of dynamic overvoltages but their cost can be prohibitive since these SVC systems are normally designed for longer-term and more frequent operation than is needed to correct DOV. Therefore they would include additional capability that is not needed for mitigation of DOV.

Referring now to FIG. 1 there is shown a dynamic overvoltage event with and without SVC or STATCOM mitigation. In FIG. 1, the solid line shows the DOV without such mitigation and the dotted line shows the DOV with such mitigation.

SUMMARY OF THE INVENTION

An apparatus for mitigating in less than the time for one cycle of a predetermined operating frequency of an AC network a short term dynamic overvoltage on the AC network has:

a distribution and power transformer having a primary connected to a high voltage bus and a secondary connected to a switching device that can switch from a nonconductive mode to a conductive mode within a time that is less than the time for one cycle of the network predetermined operating frequency; and a system connected to the switching device, the system comprising:

one or more detectors for detecting the occurrence of a condition known to cause a dynamic overvoltage on the AC network and the occurrence of a dynamic overvoltage on the AC network; and a control system connected to the switching device, the control system in response to said one or more detectors detecting at the same time both said occurrence of a condition known to cause a dynamic overvoltage on the AC network and the occurrence of a dynamic overvoltage on the AC network causing the switching device to change in less than the time for one cycle of the predetermined operating frequency from the nonconductive mode to the conductive mode to thereby short circuit the transformer secondary.

A method for mitigating in less than the time for one cycle of a predetermined operating frequency of an AC network a short term dynamic overvoltage on the AC network has the following steps:

detecting by one or more detectors the occurrence of a condition known to cause a dynamic overvoltage on the AC network and the occurrence of a dynamic overvoltage on the AC network; and providing from a control system in response to the one or more detectors detecting at the same time both the occurrence of a condition known to cause a dynamic overvoltage on the AC network and the occurrence of a dynamic overvoltage on the AC network are detected at the same time a signal to a switching device connected to the secondary of a transformer whose primary is connected to the AC network to cause the switching device to change in less than the time for one cycle of the predetermined operating frequency from a nonconductive mode to a conductive mode to thereby short circuit the transformer secondary.

DETAILED DESCRIPTION

Figure 1:
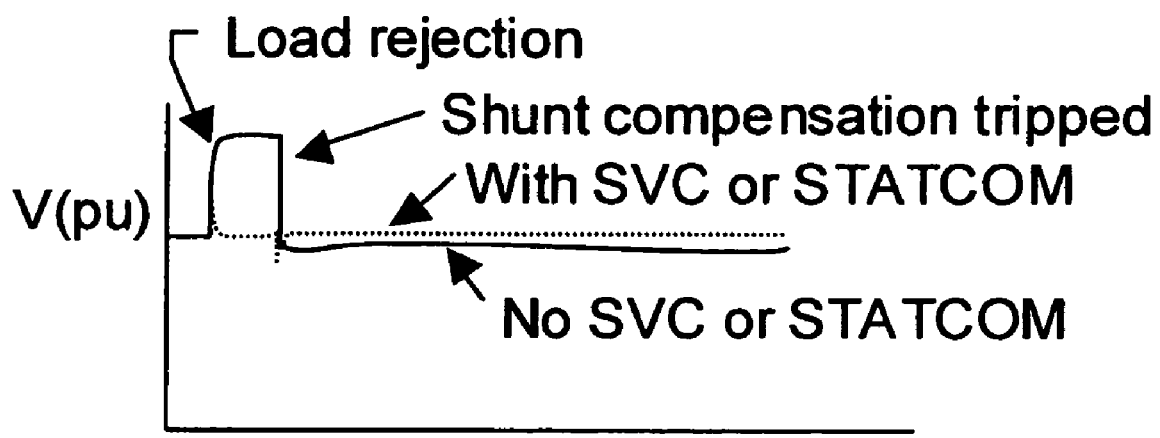
FIG. 1 shows a dynamic overvoltage event with and without prior art mitigation of the event.
Figure 2:
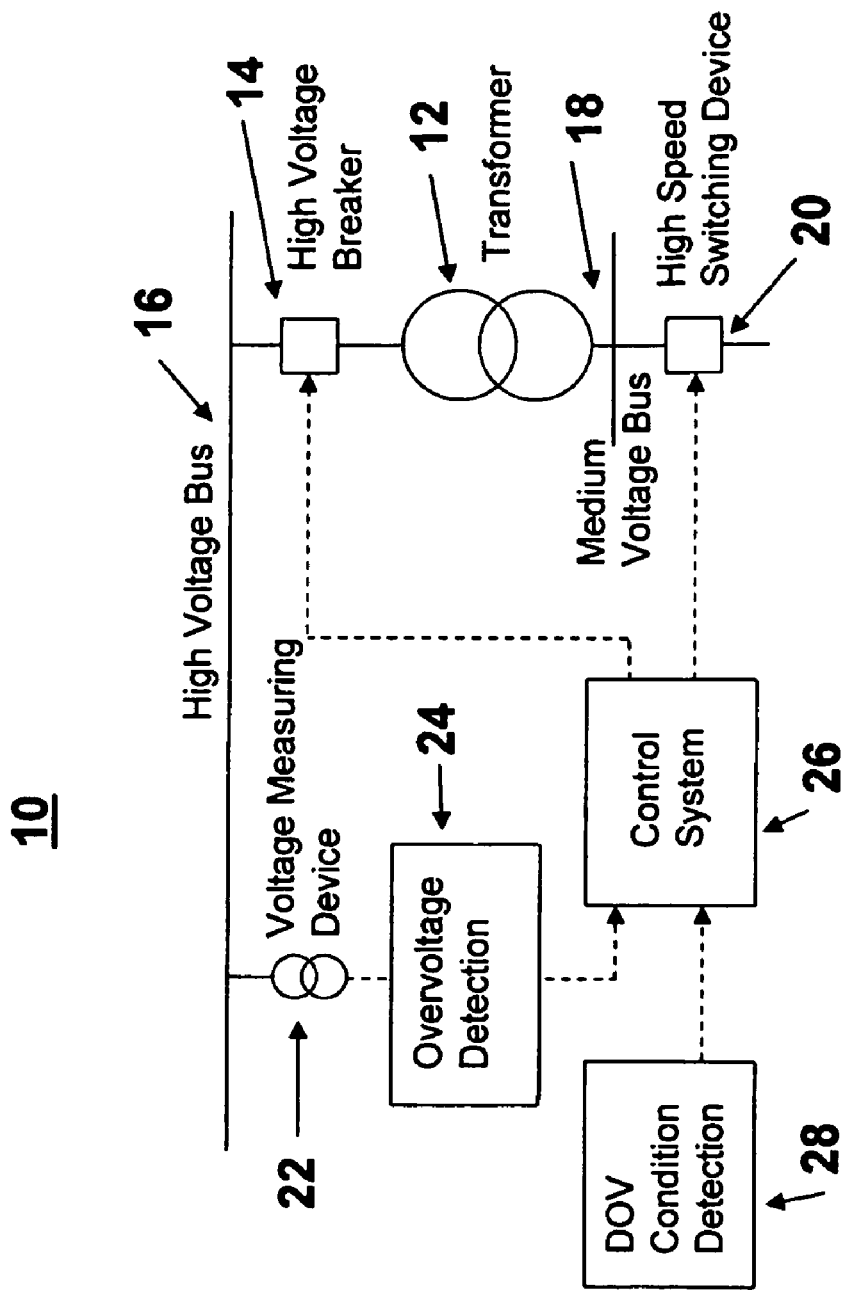
FIG. 2 shows a block diagram of a DOV mitigation apparatus embodied in accordance with the present invention.

Referring now to FIG. 2, there is shown a block diagram of an apparatus 10 embodied in accordance with the present invention that is designed only to mitigate DOV and especially short term DOV where short term means dynamic overvoltages that are less than two seconds. The apparatus 10 includes a SDLD that includes a transformer 12, a high voltage breaker 14, a high speed switching device 20, an overvoltage detector 24, a control system 26 and a DOV condition detector 28 each of which are described in more detail below.

The transformer 12 may be embodied by any well known distribution and power transformer, such as for example and without limitation, a two winding or auto transformer, with secondary voltage in the medium voltage range. The transformer 12 is designed with MVA rating and impedance values selected to give the needed reactive power absorption at the primary for conditions with the secondary short circuited. For example, a transformer 12 with 500 MVAR absorption capability at the primary (at nominal primary voltage) can be made using a 50 MVA base rated transformer with 10% leakage reactance.

The high voltage breaker 14 is connected between the HV primary side of transformer 12 and the HV bus 16. The secondary or MV side of transformer 12 is connected to MV bus 18 and to high speed switching device 20.

As is shown in FIG. 2, a typical embodiment for apparatus 10 and thus the SDLD further includes the voltage measuring device 22 connected between the HV bus 16 and the overvoltage detector 24. Detector 24 detects the occurrence of an actual overvoltage condition on HV bus 16 by measuring the AC voltage on the bus and upon the occurrence of such a condition provides an input signal to control system 26.

The DOV condition detector 28 provides an input signal to control system 26 upon the occurrence of a condition that is known to cause a DOV. As is well known the DOV condition detector 28 senses certain preset conditions that are known to cause a DOV in a particular power system. While DOV condition detector 28 is shown in FIG. 2 as a block that is separate from control system 28 it should be appreciated that detector 28 may be implemented in software in system 26 or may be implemented in hardware as a logic circuit.

The control system 26 can either be an existing system such as the Mach 2 system presently used by ABB for its HVDC technology, with additional programming for the SDLD of the present invention which is well within the skill of those of ordinary skill in this art, or a special-purpose control system built for use in apparatus 10.

For normal operating conditions, the transformer 12 is energized from the high voltage side by its connection to the HV bus 16, and its secondary circuit is open (no load). During dynamic overvoltage, the transformer secondary is short circuited by the high speed (subcycle) switching device 20. The signal from the DOV condition detection 28 causes the control system 26 to connect all three phases on the secondary side of the transformer 12 to a common point without delay if, for example, device 26 detects that the HVDC converters have blocked during an AC network configuration and power level known to cause DOV. It should be appreciated that the standards used by transformer manufacturers such as ABB for designing the power transformers that can be used to embody the SDLD of the present invention require that the transformer withstand such a secondary side connection for a limited time which is typically less than two (2) seconds. The input signal from the overvoltage detection 24 to control system 26 causes the control system 26 to short circuit the secondary of the tranformer 12 if an overvoltage is detected.

As is well known to those of ordinary skill in this art, the close timing of the individual poles (phases) of the high speed switching device 20 may optionally be selected by control system 26 in such a way as to minimize DC offsets in the secondary side currents of transformer 12. DC offsets may cause more stress on transformer 12 as the mechanical force on the transformer is proportional to the peak I in the transformer. Minimizing DC offsets also minimizes the current that has to be carried by switching device 20.

After the capacitive MVARs (such as AC filters at a HVDC station, shunt capacitor banks, or lightly loaded high voltage transmission lines) that have caused the DOV are disconnected from the system, the transformer reactive power absorption is removed from the system, either by opening the switching device 20 on the transformer secondary circuit or by opening the high voltage breaker 14 on the primary side.

A fast switching device 20 capable of conducting high currents is used on the secondary side of transformer 12 in order to mitigate the DOV in the subcyle time frame, i.e. less than eight (8) milliseconds for a 60 Hertz system. The device 20 may be, but is not limited to, one of the following:

Fast mechanical switch
Triggered spark gap
Thyristors, or other power electronic switches The device 20 chosen for a given application depends on specific conditions and detailed design studies of the power system.

While DOV detector 24, control system 26 and DOV condition detector 28 are shown in FIG. 2 as separate physical elements it should be appreciated that all of these elements could reside in a single physical system.

Figure 3A:
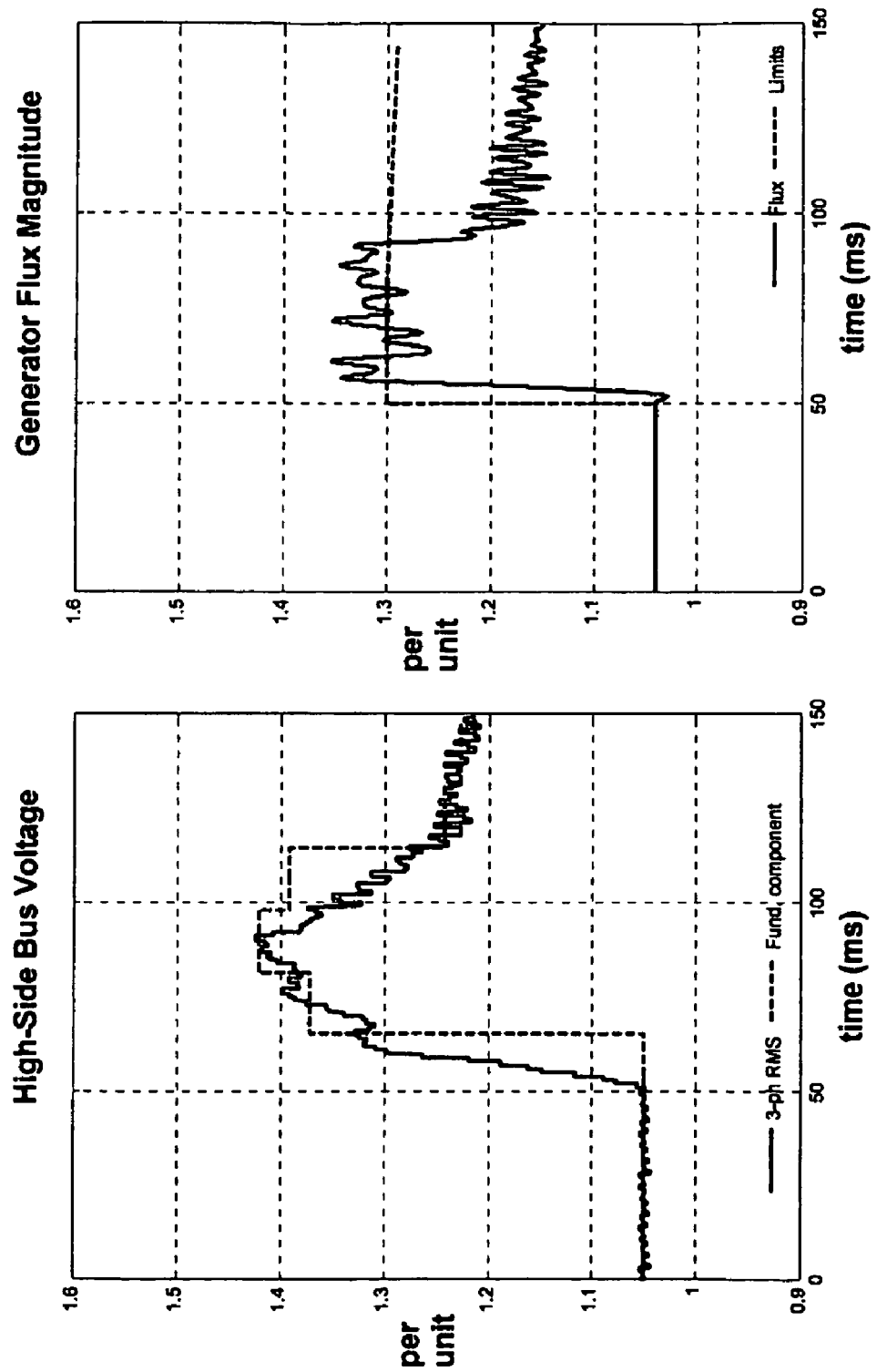
FIG. 3a graphs show the high side bus voltage and the generator flux magnitude without the Subcycle DOV Limiting Device (SDLD) of the present invention.
Figure 3B:
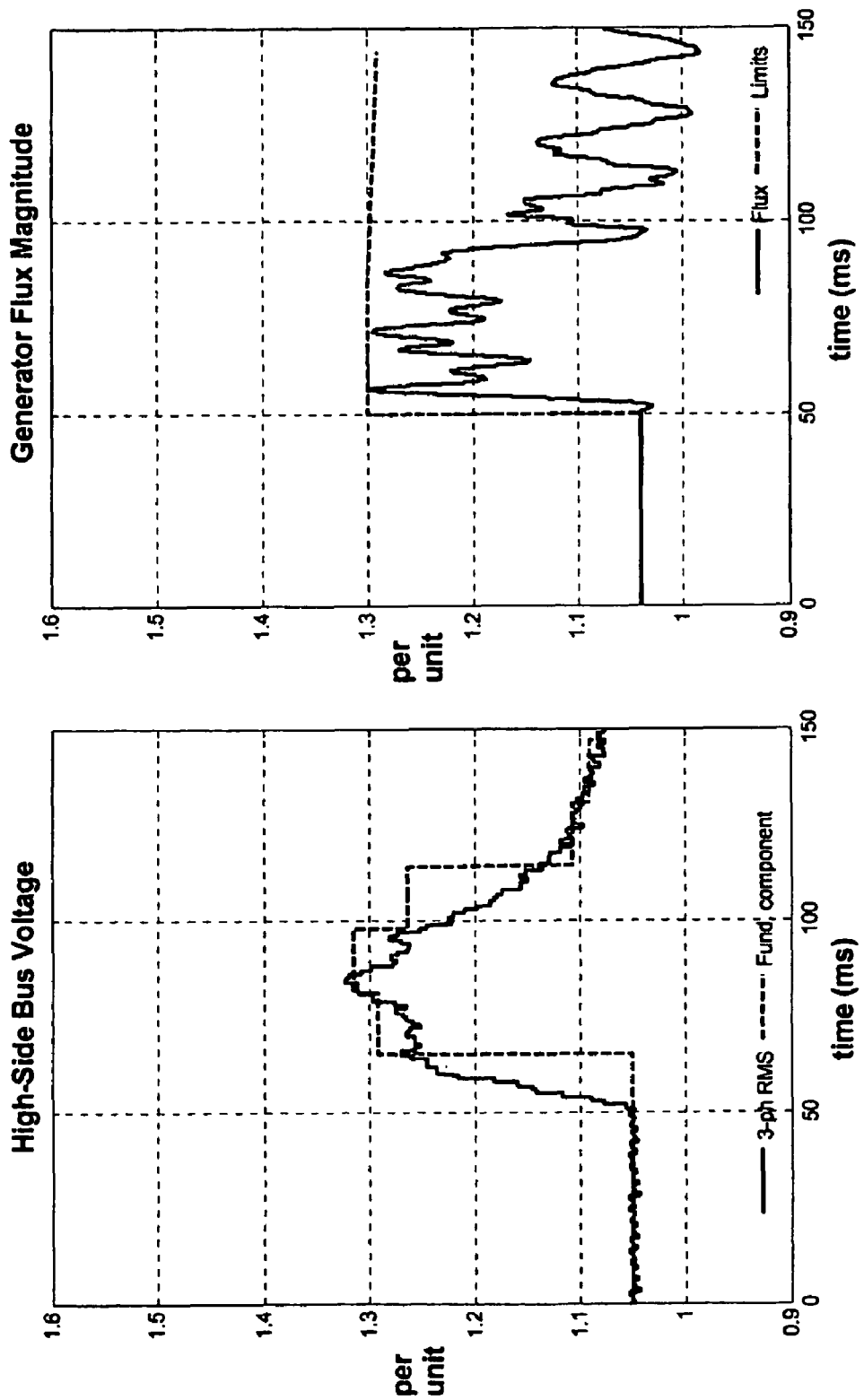
FIG. 3b graphs show the high side bus voltage and the generator flux magnitude with the Subcycle DOV Limiting Device (SDLD) of the present invention.

An example showing the performance of the SDLD of the present invention in mitigating generator overflux and DOV, that is high side bus voltage, is shown by the graphs in FIGS. 3a and 3b. The graphs in FIG. 3a show the high side bus voltage and the generator flux magnitude without the SDLD of the present invention and the graphs in FIG. 3a show those two same parameters with the SDLD of the present invention.

In the system that was tested to obtain the graphs shown in FIGS. 3a and 3b, the maximum desired high side bus voltage was 1.4 per unit and the maximum desired generator flux magnitude was 1.3 per unit. As can be seen from the left hand graph shown in FIG. 3b, the present invention easily meets the maximum desired high side bus voltage requirement when the SDLD of the present invention is used and as can be seen from the right hand graph in FIG. 3b the present invention also meets the maximum generator flux magnitude requirement when the SDLD is used.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. An apparatus for mitigating in less than the time for one cycle of a predetermined operating frequency of an AC network a short term dynamic overvoltage on said AC network, said apparatus comprising:

a distribution and power transformer having a primary connected to a high voltage bus and a secondary directly connected to a switching device that can switch from a nonconductive mode to a conductive mode within a time that is less than the time for one cycle of said network predetermined operating frequency; and a system connected to said switching device, said system comprising:

one or more detectors for detecting the occurrence of a condition known to cause a dynamic overvoltage on said AC network and the occurrence of a dynamic overvoltage on said AC network; and a control system connected to said switching device, said control system in response to said one or more detectors detecting at the same time both said occurrence of a condition known to cause a dynamic overvoltage on said AC network and the occurrence of a dynamic overvoltage on said AC network causing said switching device to change in less than said time for one cycle of said predetermined operating frequency from said nonconductive mode to said conductive mode to thereby short circuit said transformer secondary.

2. The apparatus of claim 1 wherein said one or more detectors comprises:
   a first detector for detecting the occurrence of a condition known to cause a dynamic overvoltage on said AC network and providing a signal indicative thereof to said control system; and
   a second detector for detecting the occurrence of a dynamic overvoltage on said AC network and providing a signal indicative thereof to said control system;
   said control system responsive when said signal indicative of the occurrence of said dynamic overvoltage condition and signal indicative of the occurrence of said dynamic overvoltage occurrence are both present to cause said switching device to change from said nonconductive mode to said conductive mode.

3. A method for mitigating in less than the time for one cycle of a predetermined operating frequency of an AC network a short term dynamic overvoltage on said AC network, said method comprising:
   detecting by one or more detectors the occurrence of a condition known to cause a dynamic overvoltage on said AC network and the occurrence of a dynamic overvoltage on said AC network; and
   providing from a control system in response to said one or more detectors detecting at the same time both said occurrence of a condition known to cause a dynamic overvoltage on said AC network and the occurrence of a dynamic overvoltage on said AC network a signal to a switching device connected to the secondary of a transformer whose primary is connected to said AC network to cause said switching device to change in less than the time for one cycle of said predetermined operating frequency from a nonconductive mode to a conductive mode to thereby short circuit said transformer secondary.

4. The method of claim 3 further comprising:
   providing from said first detector a signal to said control system connected to said switching device when the occurrence of a condition known to cause a dynamic overvoltage on said AC network is detected by said first detector and from said second detector a signal when the occurrence of a dynamic overvoltage on said AC network is detected by said second detector; and
   using in said control system said signal from said first detector and said signal from said second detector to cause said short circuit within a time that is less than the time for one cycle of said network predetermined operating frequency the secondary of a transformer whose primary is connected to said power network.

5. The apparatus of claim 1 wherein said switching device has predetermined characteristics.

6. The apparatus of claim 5 wherein said switching device changes from said conductive mode to said nonconductive mode with no change in said predetermined switching device characteristics.

7. The method of claim 3 wherein said switching device has predetermined characteristics.

8. The method of claim 7 wherein said switching device changes from said conductive mode to said nonconductive mode with no change in said predetermined switching device characteristics.

9. The method of claim 3 wherein said switching device has predetermined characteristics.

10. The method of claim 9 wherein said switching device changes from said conductive mode to said nonconductive mode with no change in said predetermined switching device characteristics.

11. The method of claim 3 wherein said transformer secondary is connected to said switching device without an intermediate component between said transformer secondary and said switching device.

12. The method of claim 11 wherein said intermediate component is a circuit breaker.

13. The apparatus of claim 1 wherein said dynamic overvoltage duration is less than two seconds.

14. The method of claim 3 wherein said dynamic overvoltage duration is less than two seconds.

* * * * *